(12) United States Patent
Bohner et al.

(10) Patent No.: US 9,914,491 B2
(45) Date of Patent: Mar. 13, 2018

(54) METHOD FOR PRODUCING A MOTOR VEHICLE COMPONENT FROM ALUMINUM

(71) Applicant: Benteler Automobiltechnik GmbH, Paderborn (DE)

(72) Inventors: Friedrich Bohner, Oerlinghausen (DE); Jochen Doerr, Bad Driburg (DE); Jochem Grewe, Salzkotten (DE); Christian Hielscher, Delbrueck (DE); Joern Toelle, Paderborn (DE); Boris Rauscher, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 358 days.

(21) Appl. No.: 14/683,734

(22) Filed: Apr. 10, 2015

(65) Prior Publication Data

US 2015/0291227 A1    Oct. 15, 2015

(30) Foreign Application Priority Data

Apr. 10, 2014 (DE) .................. 10 2014 105 140
Jun. 10, 2014 (DE) .................. 10 2014 108 111

(51) Int. Cl.
*B62D 29/00* (2006.01)
*B21D 53/88* (2006.01)
(Continued)

(52) U.S. Cl.
CPC ......... *B62D 29/008* (2013.01); *B21D 22/022* (2013.01); *B21D 53/88* (2013.01); *C22C 21/08* (2013.01); *C22F 1/047* (2013.01)

(58) Field of Classification Search
CPC .... B62D 29/008; B21D 22/002; B21D 53/88; C22C 21/08; C22F 1/047
See application file for complete search history.

(56) References Cited

U.S. PATENT DOCUMENTS 6,550,302 B1 *  4/2003  Ghosh ................... B21D 22/00
                                                72/342.7
2010/0218860 A1 *  9/2010  Dorr ........................ C21D 1/34
                                                148/695
(Continued)

FOREIGN PATENT DOCUMENTS

DE      102009008282 A1    8/2010
DE   10 2013 002 121 B4    4/2015
(Continued)

OTHER PUBLICATIONS

German Search Report dated Apr. 30, 2015 in corresponding German Application No. 10 2014 108 111.0.

(Continued)

Primary Examiner — Veronica F Faison
(74) Attorney, Agent, or Firm — Hauptman Ham, LLP

(57) ABSTRACT

A method for producing a motor vehicle component, is disclosed having the steps of—providing a blank composed of a 5000 grade naturally hard aluminum alloy with an initial yield strength, completely heating the blank to a forming temperature between 150° C. and 350° C., preferably between 200° C. and 300° C. in less than 20 s, preferably less than 10 s and in particular in 2 to 5 s, and performing forming in a forming tool in less than 20 s, preferably less than 10 s and in particular between 2 and 5 s, the temperature being held between 150° C. and 350° C. in at least one first region of the blank, and cooling to a temperature lower than 250° C., in particular lower than 200° C., being performed in a second region during or after the deformation.

19 Claims, 3 Drawing Sheets

Figure 1A:
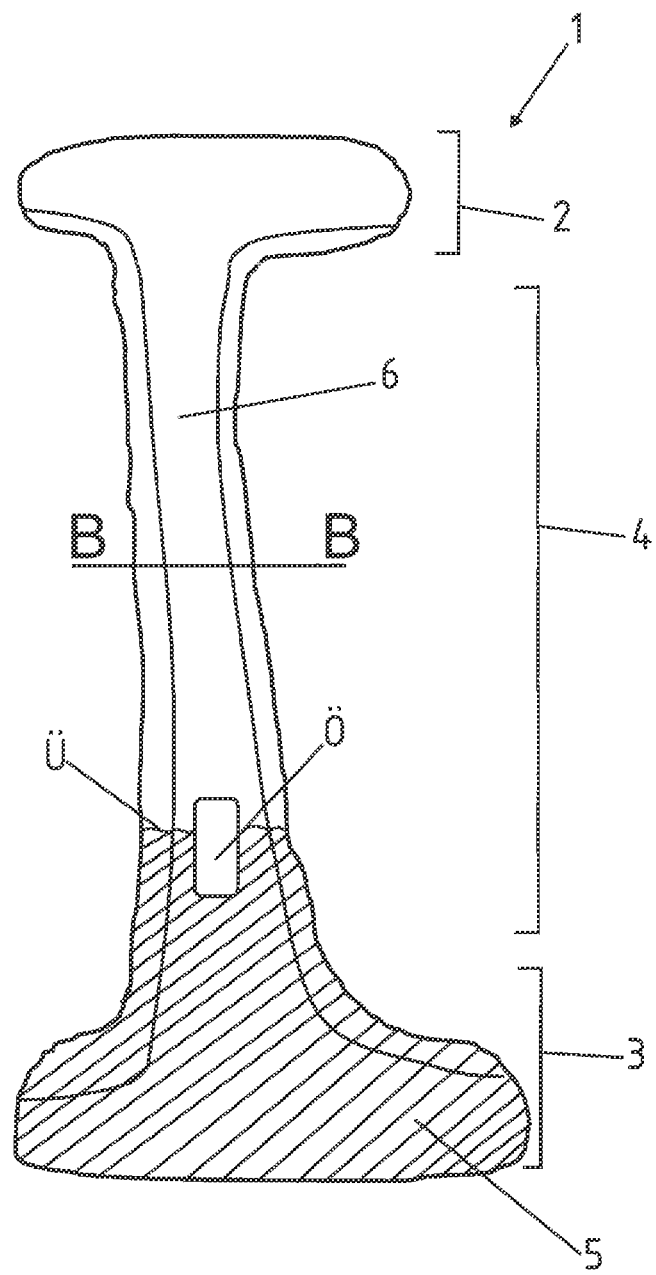

(51) Int. Cl.
  *C22F 1/047* (2006.01)
  *C22C 21/08* (2006.01)
  *B21D 22/02* (2006.01)

(56) References Cited

U.S. PATENT DOCUMENTS

| | | | | |
|---|---|---|---|---|
| 2011/0036472 A1* | 2/2011 | Carsley | ............... | C22C 21/08 |
| | | | | 148/698 |
| 2012/0273098 A1* | 11/2012 | Bohner | ............... | C22C 21/06 |
| | | | | 148/695 |
| 2013/0020000 A1* | 1/2013 | Carter | .................. | C21D 9/48 |
| | | | | 148/714 |
| 2013/0127197 A1* | 5/2013 | Diersmann | ............ | B21D 22/00 |
| | | | | 296/1.08 |
| 2016/0339497 A1* | 11/2016 | Sachdev | ............. | B21D 22/022 |

FOREIGN PATENT DOCUMENTS

| | | |
|---|---|---|
| EP | 2 415 895 A1 | 2/2012 |
| EP | 2415882 A1 | 2/2012 |
| JP | 2009-148823 A | 7/2009 |
| WO | 2012/016667 A1 | 2/2012 |

OTHER PUBLICATIONS

Harrison, Nia R. et al.,"Optimization of High-Volume Warm Forming for Lightweight Sheet", SAE Technical Paper Series, Apr. 8, 2013, pp. 1-11.

* cited by examiner

B-B

C-C

METHOD FOR PRODUCING A MOTOR VEHICLE COMPONENT FROM ALUMINUM

RELATED APPLICATIONS

This application claims the benefit of German Application No. 10 2014 105 140.8, filed Apr. 10, 2014 and German Application No. 10 2014 108 111.0, filed Jun. 10, 2014, all of which are incorporated herein by reference in their entirety.

The present invention relates to a method for producing a motor vehicle component as per the features in the preamble of patent claim 1.

It is known from the prior art for vehicle components and motor vehicle structural components to be produced from metallic materials. Here, a self-supporting motor vehicle body has imparted to it the rigidity required for normal vehicle operation. In recent years, however, the demands on motor vehicle bodies of said type have greatly increased. The focus is no longer just on styling, but is at the same time also on the targeted generation of characteristics in the event of a vehicle crash, and on consistent lightweight design.

In this regard, it is known from the prior art to use steel materials with which it is possible to provide components with high-strength or even ultra high-strength characteristics. Said high-strength or ultra high-strength characteristics are produced in targeted fashion in parts of the components.

It is alternatively known to produce motor vehicle components from aluminum. In this case, aluminum is used as a lightweight metal component and, owing to its low inherent specific weight, permits a corresponding weight saving. The production of the aluminum component for motor vehicles is known for example from DE 10 2009 008 282 A1.

It is an object of the present invention, taking the prior art as a starting point, to specify a method for producing a motor vehicle component from a light metal alloy, by means of which method it is possible in an economical and inexpensive manner to produce a motor vehicle component.

The above-stated object is achieved according to the invention by means of a production method according to the features in patent claim 1.

The dependent patent claims relate to advantageous configuration variants.

The method according to the invention for producing a motor vehicle component is characterized by the following method steps:
  providing a blank composed of a naturally hard 5000 grade aluminum alloy with an initial yield strength,
  completely heating the blank to a forming temperature between 150° C. and 350° C., preferably between 200° C. and 300° C. in less than 20 s, preferably less than 10 s and in particular in 2 to 5 s,
  performing forming in a forming tool in less than 20 s, preferably less than 10 s and in particular between 2 and 5 s, the temperature being held between 150° C. and 350° C. in at least one first region of the blank, and cooling to a temperature lower than 250° C., in particular lower than 200° C., being performed in a second region during or after the forming,
  generating a yield strength in at least one first region of less than 250 MPa and greater than 120 MPa and a yield strength in a second region of less than or equal to 450 MPa and greater than 200 MPa, the yield strength of the second region being at least 50 MPa, preferably more than 100 MPa, greater than the yield strength of the first region.

In the context of the invention, use is made of an aluminum alloy with the designation AW/AA5xxx-Hxx. This is preferably a strain-hardened aluminum alloy which has been correspondingly strain-hardened in particular by way of a prior rolling process, and which may optionally have been subjected to thermal aftertreatment in intermediate steps or subsequently. This refers in particular to a cold-rolling process prior to the heating according to the invention. The cold rolling causes dislocations to be formed in the crystal lattice, such that the strain-hardened aluminum alloy has an initial yield strength of between 200 MPa and 450 MPa, in particular 300 MPa to 450 MPa. The strength state can be verified on the strain-hardened starting material, or else on a motor vehicle component produced therefrom, by way of a tensile test. In particular, an aluminum alloy conforming to the European standard EN515:1993 in the material state H12, H14, H16, H18, H19, H22, H24, H26, H28, H32, H34, H36 or H38 is processed, this having, as alloy elements aside from aluminum, at least magnesium and possibly manganese and further alloy elements. The yield strength is the RP 0.2 yield strength.

In the context of the invention, it is now provided that a blank composed of the above-stated material is subjected to further processing in a short time, whereby it is achieved according to the invention that the mechanical characteristics, in particular the yield strength of the blank, substantially in a motor vehicle component produced therefrom by hot forming, partially only slight reductions in strength are performed.

By means of the hot forming itself, it is in turn achieved that the blank exhibits briefly high deformability. Here, however, partial soft annealing also occurs, such that the dislocations in the crystal lattice would partially form again, and the material would soften. It is thus provided according to the invention that heating is performed in a particularly short time of less than 20 seconds, thereupon forming (deformation) is performed in a time of less than 20 seconds, and furthermore, particularly preferably, partial quenching is performed during or after the forming in such a way that the quenching in the hard regions is likewise performed in less than 20 seconds.

It is achieved in this way that, in less than 60, in particular less than 50, preferably in 30 to 50 seconds, the desired hard regions in the produced component exhibit 80 to 100% of the initial yield strength of the initial blank, and consequently in particular have a yield strength between 200 MPa and 450 MPa. If, for example, a motor vehicle pillar is produced, it is provided that in particular connection regions, for example for connecting to a roof beam or to a lower side sill, remain ductile, such that these do not break or crack in the event of a crash. For this purpose, first regions in the component to be produced are jointly heated, such that initially, the complete blank is heated homogeneously. Then, in the forming tool (deformation tool) tool itself, first regions are heated such that at least one first region of the blank is held at the forming temperature, and consequently at a temperature between 150° C. and 350° C. Said temperature is also held during the forming, but initially no active cooling is performed, such that the temperature prevails in the produced component even after the completion of the forming process, and can then cool outside the tool. Consequently, no intense temperature drop is effected through active cooling, the temperature rather being held over the forming time period, such that in particular, the first region is at a temperature of greater than 150° C. for a maximum of 60 seconds. According to the invention, the first region of the blank should be at a temperature of greater than 150° C.

for preferably between 5 and 30 seconds, in particular between 10 and 20 seconds, in order to ensure adequate softening. In this way, in said region, softening is performed such that the dislocation density in the crystal lattice is reduced and a yield strength in the first region is generated which is between 40 and 80% of the initial yield strength, in particular between 120 MPa and 250 MPa. In this way, the component then has considerably more ductile characteristics in parts, in particular in connection regions or in regions which are intended to deform in the event of a crash. It is however also possible for the capacity of the component for further processing to thus be increased.

In the context of the invention, a difference in yield strength of more than 50 MPa, in particular of 100 MPa, is generated between the yield strength of the first region and the yield strength of the second region. The yield strength is thus to be regarded as a delta or difference of the yield strengths between the two regions. In particular, the yield strength of the second region lies between 50 and 150 MPa above the yield strength of the first region of the motor vehicle component.

It is furthermore particularly preferable for the blank to be trimmed before, during or after the forming. It is then hereby possible for the external component contour to be defined.

In a particularly preferred configuration variant, a blank having at least two mutually different wall thicknesses is deformed. In particular, use is made here of a tailored material, wherein the different wall thicknesses are produced in particular by partial rolling during the cold-rolling process. This is known as a tailored rolled blank. In the context of the invention, it is however also possible for use to be made of a tailored welded blank, that is to say a blank in which two sheet-metal blank parts of different wall thickness have been thermally joined together. Friction stir welding is particularly suitable for this, though other cohesive coupling methods may also be used. In the context of the invention, it is however also possible for a patched blank to be used, such that a component patch is applied to the blank. The blank is then deformed together with the component patch. In this case, the component patch is in particular adhesively bonded to the blank and fixed in position by mechanical or thermal methods, for example clinching, riveting, friction stir welding or spot welding, wherein the adhesive can be thermally activated and, when the blank is heated to forming temperature, is correspondingly adhesively bonded together with the blank.

With regard to the generation of the yield strength in the finished motor vehicle component, the values relate in each case to the main blank, that is to say to the larger of the blanks, to which at least one patch blank has been applied.

As material for the patch blank, use may be made of the same aluminum alloy as for the main blank. In this case, the initial, shipped state, or the thermal treatment, of the patch blank should be selected such that, during the forming, at least the deformability of the corresponding region of the main blank is attained. The same however also applies in the case of a different patch material being used.

It is particularly preferable, in the case of the tailored material, for a blank with thickness variations between 1 mm and 10 mm, in particular from 2 mm to 6 mm wall thickness, to be deformed. The blank may then have greater wall thicknesses at least in parts, wherein the greater wall thicknesses are between 1 mm and 15 mm, in particular between 2 mm and 12 mm and very particularly preferably between 3 mm and 10 mm, and are in particular up to 3 mm thicker than the other regions of the blank.

In particular, with the method according to the invention, a motor vehicle component composed of an aluminum alloy is produced which, in the event of a collision, is intended to locally undergo a forming which is predefined in terms of its configuration, wherein the motor vehicle component may furthermore be joined to further reinforcement parts. The reinforcement parts may also be produced in accordance with the method according to the invention. The reinforcement parts themselves are joined to the motor vehicle component after the completion of the forming process.

Said reinforcement parts constitute in particular an inner reinforcement and/or an outer reinforcement. The inner reinforcement may for example be applied in the form of a patch to the motor vehicle component that has been produced. In the context of the invention, it is however also possible for a corresponding hollow component to be produced by way of the coupling to the inner reinforcement and/or to the outer reinforcement. The reinforcements are in particular also aluminum components. The reinforcement may however also be in the form of a steel component, or applied in the form of a fiber composite material. It is particularly preferable for the reinforcement to be adhesively bonded to the motor vehicle component. The adhesive bonding is in particular combined with a thermal or mechanical joining process in order to hold the reinforcement in position during the hardening process. In the context of the invention, it is however also possible for the two components to be thermally joined to one another. Positively locking coupling methods such as riveting, in particular punch riveting, or a clinching process are also possible.

It is furthermore particularly preferable for the cooling in the second region, if the cooling is not completed during the forming process, to be performed directly subsequently to the forming, in a time of less than 20 seconds, in particular less than 10 seconds and particularly preferably less than 5 seconds. It is achieved in this way that the material hardened by the cold rolling is as far as possible not reduced in strength, or is only slightly reduced in strength, owing to the heating for the purposes of attaining improved deformability.

In particular, the regions which were not cooled or were only slightly cooled in the first cooling process are now likewise cooled, in particular cooled in targeted fashion, such that a desired strength is generated in said regions too. For this purpose, a second cooling process may be performed in a separate forming tool or else in a separate cooling tool, or also for example in a dip tank, preferably in homogeneous fashion, to less than 120° C. Said tool may be one which has a mold cavity, wherein the tool can be cooled in the mold cavity by way of cooling ducts. In the context of the invention, it may also be provided that, for the second cooling process, the component as a whole is cooled in a separate, active cooling device.

In the context of the invention, the blank or the component is furthermore particularly preferably subjected to surface treatment. This is to be understood in particular to mean a coating process, very particularly preferably a conversion coating process. The surface treatment of the blank or of the component has an advantageous effect in particular on the further processing with regard to joining. Owing to the surface treatment, the blank or the component has defined, reproducible surface characteristics, by contrast to the inhomogeneous and contaminated oxide layer that forms of its own accord under environmental influences. This has a positive effect in particular on all subsequent manufacturing processes which produce a connection to said surface, such as for example adhesive bonding or painting, or which, for stability of the process, require highly reproducible initial characteristics, such as for example arc welding.

In the context of the invention, to carry out the method, use is made in particular of a tool which has different sections, wherein the sections in the tool can assume mutually different temperatures with regard to heating or cooling. In this way, it is then possible to realize the different temperature gradients in the blank in those regions therein which are to be adjusted to different temperatures. The different sections in the forming and/or temperature adjustment tool may for example be realized by way of mutually independent temperature adjustment segments, which are in particular insulated with respect to one another.

Figure 1B:
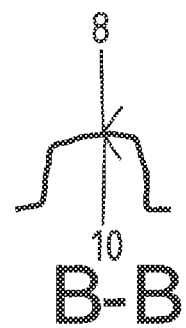
Figure 2A:
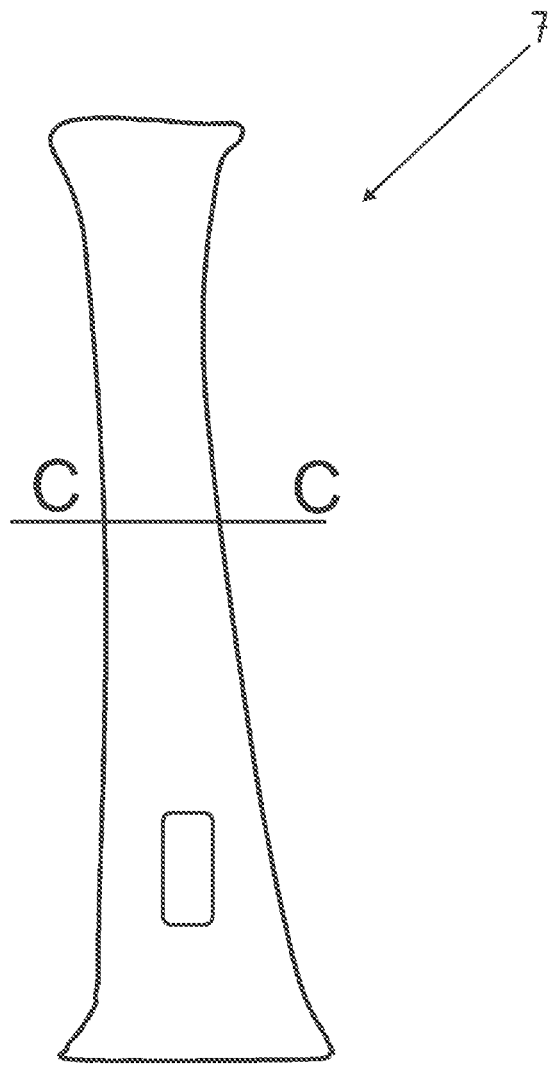
Figure 2B:
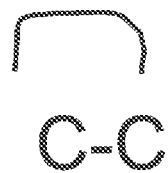

Further advantages, features, characteristics and aspects of the present invention will be discussed in the following description and illustrated in the schematic figures. Said figures serve to give a clear understanding of the invention. In the figures:

FIGS. 1a and 1b show a side view and a cross-sectional view of a motor vehicle B pillar produced according to the invention, FIGS. 2a and 2b show an outer reinforcement panel for a motor vehicle B pillar as per FIG. 1, and FIGS. 3a to 3c show an inner reinforcement panel.

In the figures, the same reference signs are used for identical or similar components, even if a repeated description is omitted for simplicity.

FIG. 1a shows a motor vehicle component 1 according to the invention in the form of a B pillar, in a side view. The B pillar has a head region 2 for connection to a roof beam (not illustrated in any more detail) and a foot region 3 for connection to a side sill (not illustrated in any more detail). Between the head region 2 and the foot region 3 there extends a central section 4 with an opening Ö. According to the invention, it is now the case that the foot region 3 and a lower part of the central section 4 are formed as a first region 5 which, during the forming process, is kept at the forming temperature, such that a relatively soft or relatively ductile microstructure, with preferably between 120 and 250 MPa, is generated here. The upper central section 4 and the head region 2 are in this case formed as a second region 6, which has harder characteristics than the first region 5 and has a yield strength of between 250 MPa and 450 MPa. The first region 5 and second region 6 are separated by a transition Ü which extends over 1 mm to 100 mm, preferably 15 mm to 50 mm. FIG. 1b shows a cross section as per the section line B-B, such that it can be seen that, during the forming process, at least the central section 4 has been formed in the manner of a hat-shaped profile in cross section. The component has thus been three-dimensionally shaped.

Furthermore, FIGS. 2a and b illustrate an outer reinforcement panel 7 in a side view and in a cross-sectional view. The outer reinforcement panel 7 has a substantially homogeneous cross-sectional profile and is, as per FIG. 2b, in the form of a U-shaped reinforcement panel. This is applied to the outer side 8, as per FIG. 1b, of the motor vehicle component 1, in particular by adhesive bonding, particularly preferably by way of an adhesive that can be thermally activated.

Figure 3A:
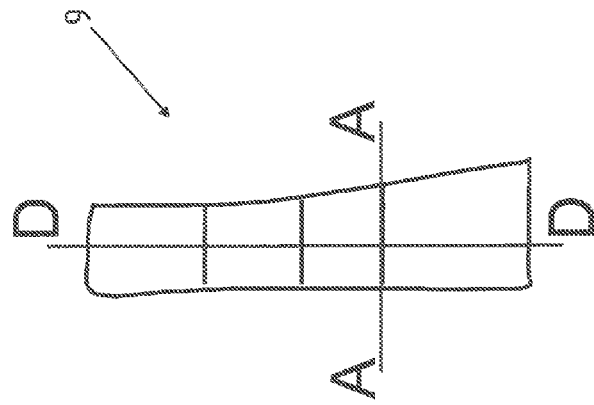
Figure 3C:
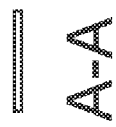
Figure 3B:
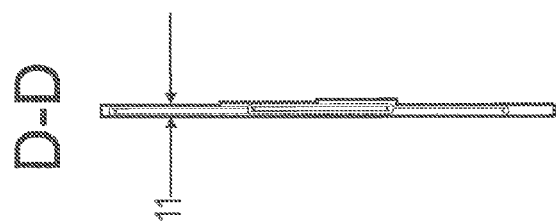

FIGS. 3a to c furthermore illustrate an inner reinforcement panel 9, which is illustrated in a side view in FIG. 3a, in a longitudinal section in FIG. 3b, and in a transverse section in FIG. 3c. The inner reinforcement panel 9 is applied to an inner side, as per FIG. 1b, of the B pillar. Along the longitudinal section line D-D, the inner reinforcement panel 9 has mutually different wall thicknesses 11 in parts over the longitudinal profile. The cross-sectional profile illustrated in FIG. 3c follows section line A-A, wherein said cross-sectional profile is of homogeneous and flat form. The inner reinforcement panel 9 is applied to the inner side 10 as per FIG. 1b, preferably by adhesive bonding.

The inner reinforcement panel is preferably produced from an aluminum alloy which has been extruded to form a profile, wherein different wall thicknesses in the profile are generated and, in a subsequent process step, the profile is trimmed longitudinally, optionally unwound into a flat form, and/or press-molded into its final shape.

REFERENCE SIGNS

1—Motor vehicle component
2—Head region
3—Foot region
4—Central section
5—First region
6—Second region
7—Outer reinforcement panel
8—Outer side of 1
9—Inner reinforcement panel
10—Inner side of 1
11—Wall thickness
Ö—Opening
Ü—Transition

The invention claimed is:

1. A method for producing a motor vehicle component, characterized by the following method steps:
providing a blank composed of a 5000 grade naturally hard aluminum alloy with an initial yield strength,
completely heating the blank to a forming temperature between 150° C. and 350° C. in less than 20 s
performing forming in a forming tool in less than 20 s, the temperature being held between 150° C. and 350° C. in at least one first region of the blank, and cooling to a temperature lower than 250° C. being performed in a second region during or after the forming,
generating a yield strength in at least one first region of less than 250 MPa and greater than 120 MPa and a yield strength in a second region of less than or equal to 450 MPa and greater than 200 MPa, the yield strength of the second region being at least 50 MPa greater than the yield strength of the first region.

2. The method as claimed in claim 1, wherein the blank or component is trimmed before, during or after the forming.

3. The method as claimed in claim 1, wherein a blank having at least two mutually different wall thicknesses is deformed.

4. The method as claimed in claim 1, wherein the motor vehicle component is a motor vehicle pillar composed of aluminum is produced, the motor vehicle pillar being coupled to an inner reinforcement panel and/or an outer reinforcement panel.

5. The method as claimed in claim 1, wherein the cooling is performed in less than 20 s.

6. The method as claimed in claim 1, wherein a second cooling process is performed, at least partially to a temperature between 120° C. and 200° C.

7. The method as claimed in claim 6, wherein the second cooling process is performed in a separate cooling tool, the second cooling process being performed in less than 20 s.

8. The method as claimed in claim 1, wherein the blank or the motor vehicle component is subjected to surface treatment.

9. The method as claimed in claim 1, wherein the motor vehicle component is manufactured from a blank with at least one applied patch.

10. The method as claimed in claim 1, wherein said completely heating the blank to a forming temperature between 150° C. and 350° C. comprises heating between 200° C. and 300° C. in less than 20 s.

11. The method as claimed in claim 1, wherein said completely heating the blank to a forming temperature between 150° C. and 350° C. comprises heating between 200° C. and 300° C. in less than 10.

12. The method as claimed in claim 1, wherein said performing forming in a forming tool in less than 20 s comprises performing forming in less than 10 s.

13. The method as claimed in claim 1, wherein said performing forming in a forming tool in less than 20 s comprises performing forming between 2 and 5 s.

14. The method as claimed in claim 1, wherein the yield strength of the second region being at least 50 MPa comprises being more than 100 MPa.

15. The method as claimed in claim 4, wherein a motor vehicle pillar is adhesively bonded to an inner reinforcement panel and/or an outer reinforcement panel.

16. The method as claimed in claim 15, wherein the adhesive is thermally activatable.

17. The method as claimed in claim 1, wherein the cooling is performed in less than 10 s.

18. The method as claimed in claim 6, wherein the second cooling process is performed in a separate cooling tool, the second cooling process being performed in less than 10 s.

19. The method as claimed in claim 1, wherein the blank or the motor vehicle component is conversion-coated.

* * * * *